United States Patent [19]

Eldridge et al.

[11] Patent Number: 4,542,461

[45] Date of Patent: Sep. 17, 1985

[54] APPARATUS FOR ACQUIRING DUMP TRUCK DUTY CYCLE DATA

[75] Inventors: Joseph L. Eldridge, Libertyville; E. A. Domes, Carpentersville, both of Ill.

[73] Assignee: Payhauler Corporation, Batavia, Ill.

[21] Appl. No.: 388,007

[22] Filed: Jun. 14, 1982

[51] Int. Cl.[4] .............................................. G06F 15/20

[52] U.S. Cl. .................................. 364/424; 340/52 F

[58] Field of Search ................................ 364/424–426, 364/565; 340/56 R, 52 F; 324/160, 166; 346/33 D; 377/15, 16, 20, 24

[56] References Cited

U.S. PATENT DOCUMENTS

| | | | |
|---|---|---|---|
| 3,792,445 | 2/1974 | Bucks et al. | 377/16 |
| 4,035,621 | 7/1977 | Kemp | 364/424 |
| 4,072,850 | 2/1978 | McGlynn | 340/52 F |
| 4,188,618 | 2/1980 | Weisbart | 340/52 F |
| 4,258,421 | 3/1981 | Juhasz et al. | 364/424 |
| 4,338,512 | 7/1982 | Ludwig | 377/20 |
| 4,344,136 | 8/1982 | Panik | 364/424 |
| 4,395,624 | 7/1983 | Wartski | 364/424 |

OTHER PUBLICATIONS

"Datamyte 400", published by Electro General Corporation of Minetonka, Minesota.

"457 Switchable Time at Level Program", published by Electro General Corporation of Minetonka, Minesota.

*Primary Examiner*—Gary Chin

*Attorney, Agent, or Firm*—McDermott, Will & Emery

[57] ABSTRACT

A duty cycle data acquisition system for a truck having an elevatable dump body, a hydraulic hoisting mechanism, throttle and transmission controls, and a retarder further including a microprocessor having an analog imput corresponding to ground speed of the truck and which records the amount of time the ground speed remains in any of a plurality of increments corresponding to the speed range of the truck in one of eight histogram output memories selectively determined by the inputs of a plurality of on-off switches corresponding to throttle position, transmission forward or reverse position, retarder position, and a one-shot timer switch activated by a loaded dump body actuating circuit, the latter circuit including a switch sensing body position relative to the frame disposed in series with a pressure switch located in the hoist mechanism, the pressure switch being calibrated to close only when a loaded body is lifted.

1 Claim, 2 Drawing Figures

APPARATUS FOR ACQUIRING DUMP TRUCK DUTY CYCLE DATA

BACKGROUND OF THE INVENTION

The present invention relates to an apparatus for acquiring dump truck duty cycle data in a form useful for determining truck performance and severity of operation.

In large construction projects, such as the building of a highway or dam, a construction company will utilize a number of dump trucks and operate these dump trucks for long hours. In order to avoid breakdown of a dump truck and to have some indication when the dump truck should be pulled off the job for maintenance, many construction companies are anxious to measure truck activity and, more specifically, such duty cycle parameters as the hours the truck has been running, its fuel consumption, the job severity, and the productivity of the truck use, as determined by the number of loads dumped (dump cycles).

Heretofore, one method for obtaining duty cycle data of this nature has been to obtain or gather data in the form of ground speed or engine speed histograms recorded on circular graphs. However, the analysis of these circular graphs provided very limited insight into truck activity and did not provide a convenient means for maintaining summary results or for identifying deviation from normal truck operation or from normal truck productivity.

More recently, data recording instruments have been introduced which use microprocessor computer systems to obtain and to record the data in histogram form in a memory pack for subsequent interfacing with computers for analysis. One such commercially available instrument is identified as the "DATAMYTE® 400" sold by Electro General Corporation of Minnetonka, Minn. More specifically, when operated with its "457 Switchable Time at Level" Program, the "Datamyte 400" microprocessor is capable of determining whether an analog input, such as vehicle speed, is within one of 32 increments and recording the time that the signal remains in that increment in one of eight separate memories depending on the actuated combination of three external switch inputs. With a special binary coded switch cable, eight individual inputs can be separately actuated to channel the analog input to a separate memory. With other programs, the Datamyte can count events, such as the amount of closures of the three external switches.

However, in dump truck operation it is desirable not only to measure the amount of time the truck is operating at a given speed level within a given mode, such as full throttle forward, but also to measure events, especially the completion of a dump cycle when the operator raises his loaded dump body to dump the material therein.

SUMMARY OF THE INVENTION

Accordingly, it is a primary object of the invention described and claimed herein to provide a dump truck duty cycle data acquisition system which measures and records the ground speed of the truck at various levels in a discrete memory for each of the principle modes of operation and which also records the dumping of a loaded dump body.

It is further an object of the event to provide a circuit for counting duty cycles of dump trucks which provides a signal only when a loaded dump body is dumped.

These and other objects of the invention as may become more apparent hereinafter are met in a duty cycle data acquisition system for a truck having an elevatable dump body, a hydraulic hoisting mechanism, throttle and transmission controls, and a retarder further including a microprocessor having an analog input corresponding to ground speed of the truck and which records the amount of time the ground speed remains in any of a plurality of increments corresponding to the speed range of the truck in one of eight histogram output memories selectively determined by the inputs of a plurality of on-off switches corresponding to throttle position, transmission forward or reverse position, retarder position, and a one-shot timer switch activated by a loaded dump body actuating circuit, the latter circuit including a switch sensing body position relative to the frame disposed in series with a pressure switch located in the hoist mechanism, the pressure switch being calibrated to close only when a loaded body is lifted.

BEST MODE FOR CARRYING OUT THE INVENTION

Figure 1:
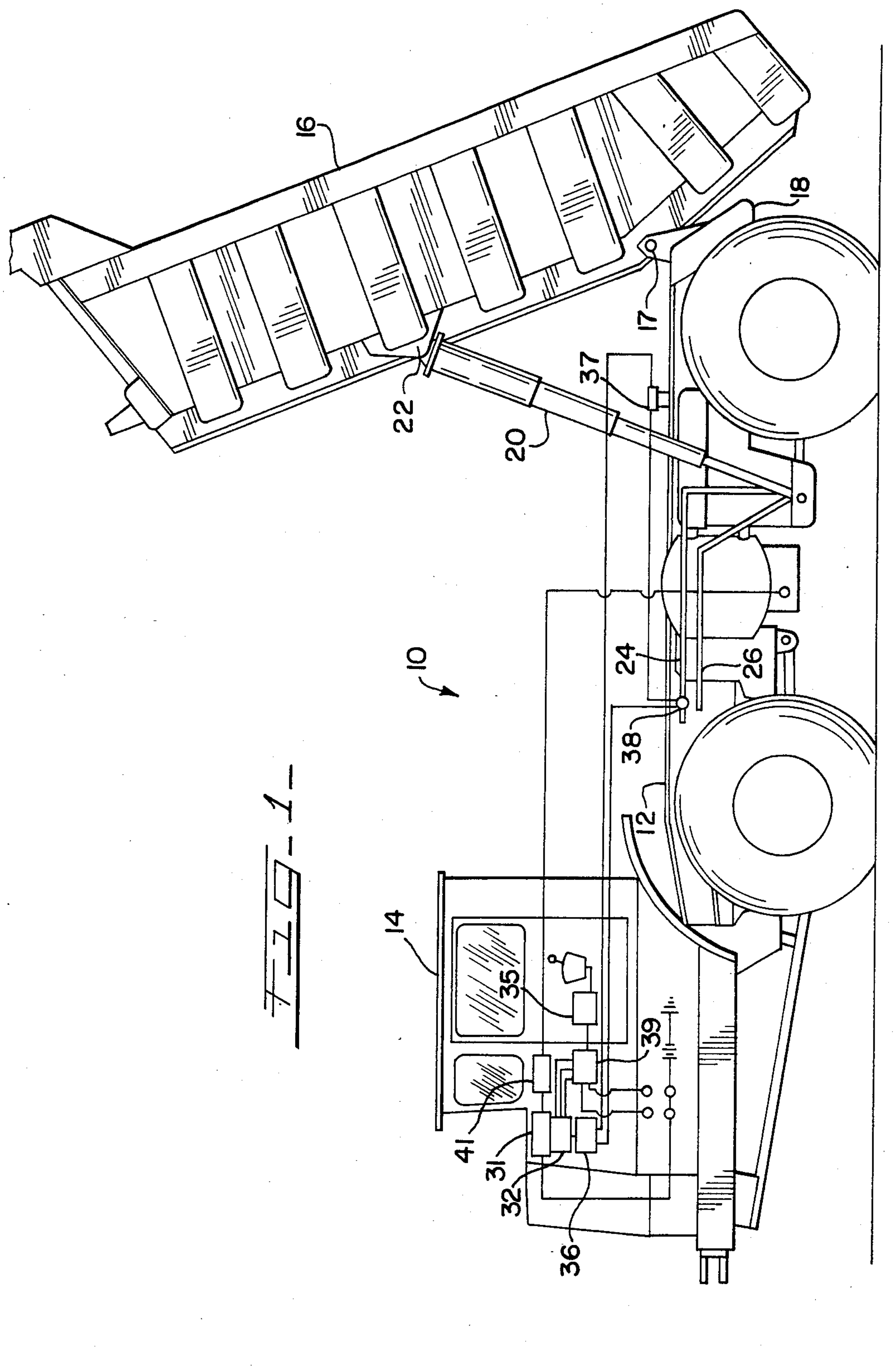
FIG. 1 is a side elevational view of a dump truck with the dump body in the raised position and shows schematically some of the switches and sensors of the electrical apparatus of the present invention.

Referring now to the drawings in greater detail, there is illustrated in FIG. 1 a side elevational view of a conventional dump truck generally identified by the reference numeral 10. The dump truck 10 has a frame 12, a cab 14 mounted at the front end thereof, and a dump body 16 at the rear end thereof. The dump body 16 is pivotally mounted at 17 to the end 18 of the truck frame 12 and is raised and lowered by a conventional hydraulic hoist cylinder mechanism 20 that is pivotally connected between the frame 12 and the bottom 22 of the dump body 16. Hydraulic supply and return lines 24, 26 are connected through a control valve (not shown) to the vehicle hydraulic system to provide fluid pressure to the hoist cylinder for raising the body 16.

In accordance with the teachings of the present invention, an electrical apparatus 30 is provided for sensing and storing different operating parameters of the dump truck 10. Then, by relating this operating parameter data to empirically known truck and engine operation data or relationships, performance parameters of dump truck operation are determined as well as the number of duty cycles.

This electrical apparatus 30 includes a microcomputer or a microprocessor controlled, histogram recorder/processor 31 which is realized in a preferred embodiment by the microprocessor controlled unit sold by the Electro/General Corporation of Minnetonka, Minn. under the trademark "DATAMYTE 400". Briefly, this microprocessor controlled unit records a single input signal in any of eight output memories in histogram form depending on the actuation of external switches.

In addition to the microprocessor controlled, histogram recorder/processor 31, the electrical apparatus 30 includes a diode circuit 32 which is preferably realized by Electro/General Diode Circuit No. 7053. This diode circuit 32 channels data from a number of sensors switches 33-36 to the microprocessor controlled, histogram recorder/processor 31. Data from sensors 37 and 38 is supplied through switch 36, to be described in greater detail hereinafter to the diode circuit and data from sensor switches 33, 34, and 35 are channeled through a relay and logic circuit 39 to the diode circuit 32. The sole function of relay and logic circuit 39 is to sense the presence of simultaneous signals in 33, 34, and 35 and, in that event, to change the switch combination at 32 and thus transfer them from normal histogram 7 to histogram 3 which as will be seen hereinafter is practically unused. This is to accommodate the specific circuitry of the Datamyte processor so that all data in histogram 7 is recorded only with one-shot timer 36 is activated.

One parameter sensor, 40, senses the speed of the output of the transmission in a conventional way and supplies this signal, indicative of the truck ground speed to a speedometer 41 which then supplies such signal as an analog signal directly to the microprocessor controlled, histogram recorder/processor 31 as shown. The speed parameter is stored in the memory of the microprocessor controlled, histogram recorder/processor 31, when it is supplied with a plug-in program pack sold by Electro/General under the trademark "457 SWITCHABLE TIME AT LEVEL", in a manner to be described hereinafter.

To ensure operation of the apparatus 30 only when the engine is operating, the power supply 50, which is typically a 24 volt battery, is coupled to the microprocessor controlled, histogram recorder/processor 31 through series connected switches 51 and 52 and a bus 54. 51 is the main electrical or ignition switch for the truck engine and 52 is an engine oil pressure switch, both of which must be closed to supply power to the microprocessor 31. Switch 52 is closed when engine oil pressure has reached normal engine operating pressure and thus prevents data from being recorded without the truck operating if the switch 51 is accidentally left on.

A retarder switch 33 is coupled to the relay logic circuit 39. This switch is set to be closed when the truck retarder has been moved nearly to full retarder—to about 80% full retarder. The retarder is a braking mechanism commonly used in off-highway trucks that is associated with the drive drain and includes vanes on a hub fixed to a section of the transmission input drive shaft so as to rotate therewith. The hub is enclosed in a housing which fixedly carries a set of stationary vanes positioned opposite the rotating vanes. When a fluid, such as transmission fluid, is supplied to the housing, the fluid friction created in the area between the stationary vanes and the rotating vanes creates a drag to slow down or retard the drive shaft. When the retarder is not operating, the fluid is vented from the housing back to the hydraulic reservoir or sump. In truck operation, the retarder is almost always either fully or on fully off.

The throttle switch 34 senses the position of the injection pump control lever of the diesel engine commonly used in such trucks, and is set to be closed when the vehicle throttle is moved to almost the full throttle position i.e., to 85–95% full throttle. In this respect, the vehicle engine is operated at idle, part throttle or full throttle. If there is no ground speed, idle operation can be assumed. Otherwise, part throttle operation is assumed. Switch or relay 35 associated with the vehicle transmission control lever senses when the truck is being operated in reverse and this sensing is supplied to relay logic circuit 39.

A one shot timer switch 36 is actuated when the dump body 16 is raised but only if the body is loaded. This is effected by the closing of two switches 37 and 38. Switch 37 is mounted on the frame 12 and normally is open when the body is down and becomes closed when the dump body 16 is raised. The switch 37 is in series with a pressure switch 38 in the hydraulic fluid supply line 24 which senses the pressure in the hoisting cylinder mechanism 20. Since the hoist cylinder pressure will be considerably greater when the dump body 16 is loaded, the switch 38 can be precalibrated to be activated only when the hoist cylinder 20 lifts the body in a loaded condition.

The one shot timer switch 36 is closed for a specified length of time when switch 38 is closed at the same time switch 37 is closed, regardless of the time these switches remain closed. With proper time setting on the switch 36, the truck operator is prevented from accumulating more than one dump cycle, even if he cycles the loaded body up and down in a short period of time. It is noted that position switch 37 will be open momentarily after the hoist pressure is built up to raise the dump body 16 to close switch 38 until the body 16 is raised a small distance but the one-shot time will not be triggered until both switches close.

The speedometer 41 senses speed from 0 to some speed in excess of the maximum rate of speed of the truck. In one preferred embodiment, the microprocessor controlled, histogram recorder/processor 31 divides this into 32 speed increments from 0 to 48 mph with each increment having a speed range or increment of about 1.5 mph when equipped with the "Switchable Time at Level" program pack. This input speed parameter is then recorded in histogram form, that is, in terms of accumulated time in each one of the 32 discrete speed ranges or increments. The input speed histogram data will be recorded in any one of eight output memories of the microprocessor 31, thereby producing eight separate histograms which are typically numbered 0 through 7, depending on the positional combination of the four switches 33-36 thus resulting in the principle modes of operation and dump cycles being separately stored.

The microprocessor controlled, histogram recorder/processor 31 has three switch inputs 71, 72, 73 connected to the diode circuit 32 which has seven inputs each of which, when shorted to ground, one at a time, will create a logic at the switches 71, 72, 73 that will cause the microprocessor controlled, histogram recorder/processor 31 to store the input parameter data in a particular one of the eight possible histograms. The first histogram, or histogram 0, is selected if none of the inputs is shorted to ground. The histogram selector circuit in the microprocessor controlled, histogram recorder/processor 31 receives a binary coded signal from the diode circuit 32 and channels the signal to the correct histogram memory.

However, it will be understood that the external switches, namely switches 33 through 36 may be open or closed in various combinations. Since the microprocessor controlled, histogram recorder/processor 31 is designed to function logically when any or all of the three input switches 71, 72, 73 used are closed, only four of the possible seven input connections are utilized in the diode circuit 32. The four switches are the retarder switch 33, the throttle switch 34, the reverse switch or relay 35, and the one shot timer switch 36 which provides a count of loaded dump cycles. Although this still appears to be one switch too many to keep the logic unscrambled with multiple actuation of the stiches 33-36, the relay circuit 39 takes care of the full throttle, full retarder, reverse position by switching it to histogram 3, which is full throttle full retarder forward, a practical impossibility, and if the one-shot timer switch 36 is closed, the other positions of switches 33-35 are irrelevant. The practicalities of truck operation result in only eight histograms being necessary, if that.

Figure 2:
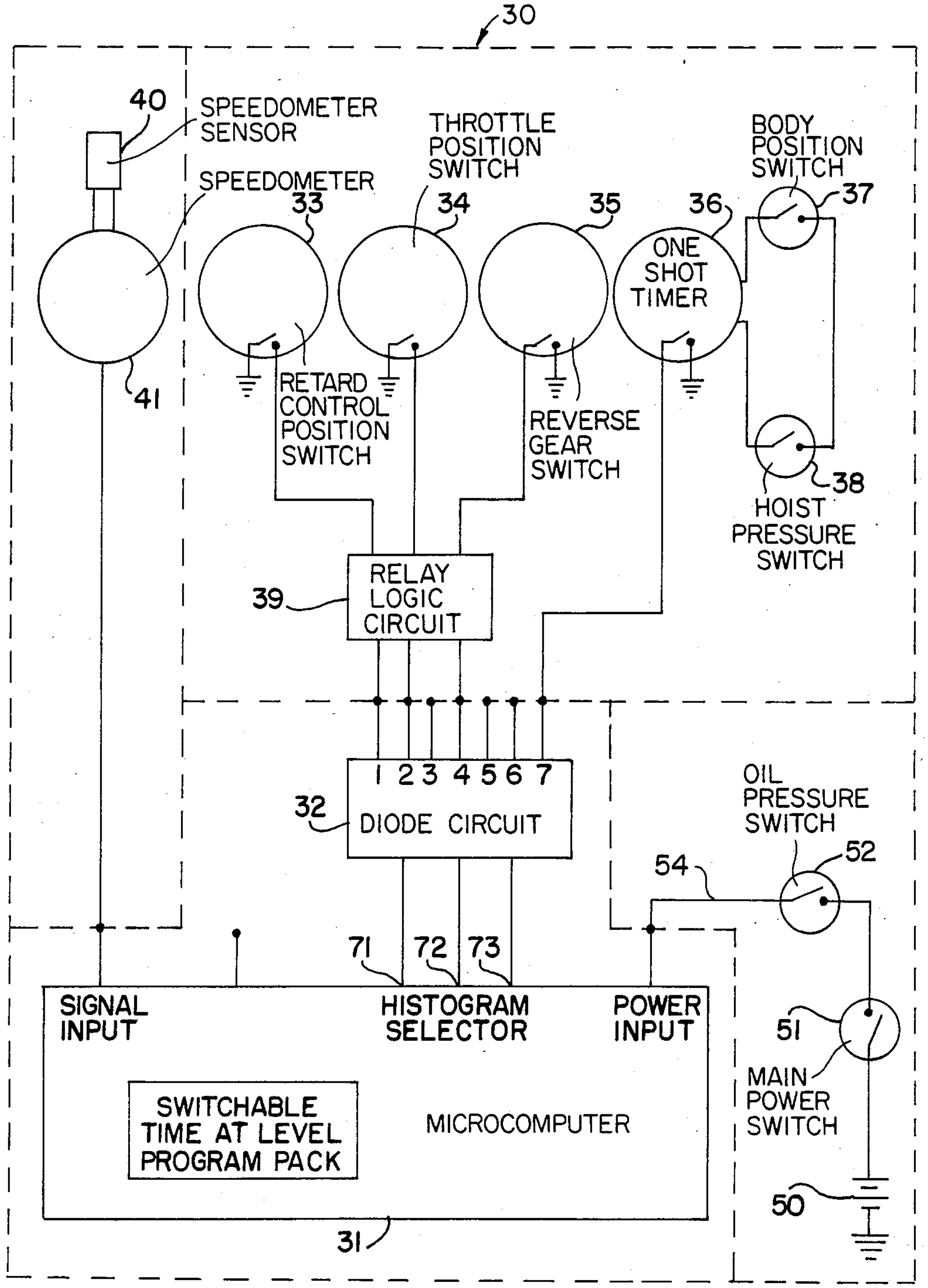
FIG. 2 is a block schematic circuit diagram of the electrical apparatus of the present invention for acquiring duty cycle data of a dump truck.

As shown in FIGS. 1 and 2, the retarder control position switch 33 and the throttle position switch 34 are on/off switches which are normally open but closed when the respective control is near the fully applied position, e.g., 90% closed. The reverse gear switch 35 is typically realized by a relay in the truck's backup light and warning buzzer circuit. This relay is normally open but is closed when the truck's transmission is shifted to reverse.

The microprocessor controlled, histogram recorder/processor 31, namely the "DATAMYTE® 400" with the "457 Switchable Time At Level"® program pack does not have an event counter. It is capable only of recording time spent at discrete levels of the signal input parameter which in this case is truck speed. By use of the "one shot"timer 36 histogram 7 is converted to an event counter which in effect counts the number of times the truck's dump body dumps a load that is a count of truck duty cycles, by dividing the total time accumulated in histogram 7 by the specific time setting of the one-shot timer 36.

In practicing the present invention, the ground speed of the truck is inputted to the microprocessor controlled, histogram recorder/processor 31 which records the time that the speed remains in each of its 32 increments and sends this to its memory. At the same time, the diode circuit 32 is inputting through switches 71, 72, 73 into the histogram selector circuit information regarding the mode of operation in which the truck is operating as defined by switches 33-36. From these four inputs, histograms 0 through 7 are created. These histograms are as follows:

HISTOGRAM 0—part throttle, no retarder, forward or neutral.

HISTOGRAM 1—part throttle, full retarder, forward

HISTOGRAM 2—full throttle, no retarder, forward

HISTOGRAM 3—full throttle, full retarder, forward or reverse

HISTOGRAM 4—part throttle, no retarder, reverse

HISTOGRAM 5—part throttle, full retarder, reverse

HISTOGRAM 6—full throttle, no retarder, reverse

HISTOGRAM 7—body dump cycle counter (truck speed data recorded here while timer is in "on" mode, regardless of what other external switches are closed)

With 8 histograms and 32 speed increments in each 256 "bins" of information are thus developed and stored in the microprocessor controlled, histogram recorder/processor 31. The data sensed, collected and stored in these 256 bins may then be removed from the microprocessor controlled, histogram recorder/processor 31 for post processing using a general purpose digital computer. For example, the data may be compared to known empirical data for the truck, transmission, engine combination to determine the severity of a given application of the truck as well as engine speed, horsepower, and fuel comsumption and one calculates the number of loaded body dumping duty cycles as described above.

Also, many modifications can be made to the method and apparatus 30 of the present invention without departing from the teachings of the invention. Accordingly, the scope of the invention is only to be limited as necessitated by the accompanying claims.

What is claimed is:

1. An apparatus for use in combination with a dump truck having a frame, an elevatable dump body on the frame and a hydraulic hoist therefor, an engine having a throttle, a retarder, and a transmission having a reverse gear, to acquire as duty cycle data a measurement of the use of system components such as the drive train usage, retarder usage, reverse gear and dump cycle usage, from said truck comprising:

ground speed sensing means associated with said truck and having an output signal;

a plurality of sensing switches associated respectively with said engine throttle, retarder, and transmission reverse gear and producing separate output signals in the full throttle, retarder-on, and reverse-gear-on positions respectively and no signal in the part throttle, no retarder, and forward positions respectively;

a hoist pressure switch for sensing pressure in said hydraulic hoist corresponding to a loaded dump body;

a body position switch closed when said dump body is elevated from said frame;

a one-shot timer switch, having an actuating circuit containing said body position switch and said hoist pressure switch in series such that said one shot-timer is activated only when a loaded dump body is raised from said frame;

a microcomputer having an inner for receiving said ground speed signal, and inputs for each of said engine throttle, retarder, transmission and one-shot timer switches, said microcomputer being programmed to measure the time interval that said ground speed signal is within each of a plurality of finite increments corresponding to the speed range of said truck, said microcomputer further having a plurality of data memories and internal switching means responsive to the presence or absence of a signal from any of said engine, retarder, and transmission switches, and from said one-shot timer for selectively recording said time interval in each of said finite increments in a specific one of said data memories depending on a signal produced by a combination of said switches whereby each of said memories contains a histogram containing the total elapsed time of each speed increment for a given mode of operation of said truck.

* * * * *